_United States Patent Office_ 3,119,829
Patented Jan. 28, 1964

3,119,829
5-TROPINYL DIBENZOCYCLOHEPTENE
DERIVATIVES
August Franciscus Harms, Amsterdam, Netherlands, assignor to N.V. Koninklijke Pharmaceutische Fabrieken v/h Brocades-Stheeman & Pharmacia, Meppel, Netherlands, a corporation of the Netherlands
No Drawing. Filed Mar. 22, 1960, Ser. No. 16,660
Claims priority, application Netherlands Apr. 1, 1959
3 Claims. (Cl. 260—292)

This invention relates to a process for the preparation of therapeutically active compounds of the general formula

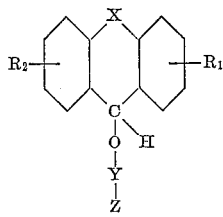

in which

X represents a —$CH_2$—$CH_2$— or a —CH=CH-group;
$R_1$ and $R_2$ represent hydrogen, a halogen atom or an alkyl group having 1–4 carbon atoms;
Y represents a straight or branched hydrocarbon chain having if necessary not more than 6 carbon atoms which may be interrupted by an oxygen atom;
Z represents a dialkylamino group in which one or both alkyl groups, together with the nitrogen atom and if desired with the carbon chain Y, may form one or more heterocyclic rings in which, in addition to said nitrogen atom, a second heteroatom may be present, and also salts and quaternary ammonium compounds thereof.

The salts may be derived both from inorganic acids, e.g. the hydrohalic acids, or from organic acids, e.g. maleic acid, oxalic acid or tartaric acid.

Preferred halogen substituents are chlorine and bromine where as suitable alkyl groups are especially methyl, ethyl, propyl, isopropyl, butyl and tertiary butyl.

The novel compounds according to the invention may be prepared according to methods known for analogous compounds. They may be produced from 5-hydroxy dibenzocycloheptane derivatives having the general formula:

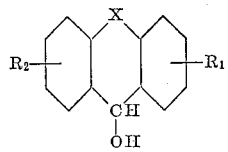

by reacting these hydroxy compounds or functional derivatives thereof with substituted aminoalcohols or functional derivatives thereof.

According to a preferred embodiment of the invention a substance having the formula

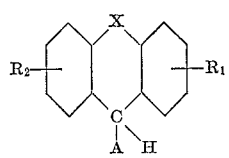

is reacted with a compound of the general formula

B—Y—Z 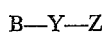

in which one of the two symbols A and B represents a halogen atom and the other O-metal, or the symbol A represents a halogen atom and the symbol B an OH-group.

In the last mentioned case the reaction may be carried out while using an excess of the amino alcohol or with the addition of another acid binding substance. Preferably the chloride of the aromatic carbinol is reacted with an excess of the amino alcohol at a temperature of 140–160° C., by which the hydrochloride of the amino alcohol and the free base of the desired compound are formed.

Quite satisfactory results are also achieved if both A and B represent an OH-group and both components are heated, either or not in solution, in the presence of an organic sulphonic acid, e.g. paratoluene sulphonic acid.

The 5-hydroxy dibenzocycloheptane derivatives may be obtained e.g. by cyclization of a 1,2 diphenylethane compound having the general formula

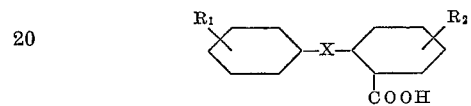

and reduction of the ketone formed to the corresponding hydroxy compound. Compounds in which the group X= —CH=CH— are preferably obtained by conversion of the —$CH_2$—$CH_2$-group into the —CH=$CH_2$-group by conventional methods.

The preparation of these 5-hydroxy dibenzocycloheptane derivatives forms the subject of my copending patent application Serial No. 141,590, filed September 28, 1961, and for further particulars concerning the same said application is referred to.

Of the carbinols which may be used as starting products for the manufacture of the compounds according to the application the dibenzo-(a,d) 1,4-cycloheptadienol-5 having a melting point of 91–92° C. and the dibenzo-(a,e) 1,3,5-cycloheptatrienol-5 are known. The first-named compound is described by E. D. Bergmann et al., Bull. Soc. Chim. Fr., 18, 684 (1951), the latter by Treibs and Klinkhammer, Ber., 83, 367 (1950), and Ber., 84, 671 (1951), who indicates 98° C. as the melting point and also by Berti, Gazz. Chim. ital. 86, 883 (1956), and 87, 293 (1957), who gives 120° C. as the melting point.

It has been found that the compounds according to the invention have particularly interesting pharmacological properties. Thus, an investigation of the spasmolytic activity on the isolated intestine of guinea pigs shows that they have an antihistaminic activity which is some times greater than that of the known antihistaminic diphenhydramine, whereas the antiacetyl choline activity and the Anti-BaCl$_2$-activity are about five times that of diphenhydramine.

They also have a central activity, as appears i.e. from their fore, inter alia, action on tremors induced by the compound 1,4-dipyrrolidinobutyne-(2) (Tremorine), from the reduction of the "compulsive circling" in guinea pigs caused by the administration of Eserine (physostigmine) and from the prolongation of the sleeping period of mice after subcutaneous injection.

The toxicity of the compounds according to the invention, expressed in LD$_{50}$ on mice, is about 40 mg./kg. after intravenous and about 200 mg./kg. after subcutaneous administration.

Very exceptional results were obtained in the course of the pharmacological examination of the compound dibenzo (a,d) 1,4-cycloheptadienyl 5-tropinyl ether maleinate. This substance has an anti acetylcholine activity which is much stronger than that of atropine, while the antihistaminic activity exceeds that of diphenhydramine by far.

The ethers of dibenzo-(a,d)-1,4-cycloheptanol with the following alcohols also show very interesting activities:

β-Hydroxy ethyl morpholine
β-Hydroxyethyl pyrrolidine
α-Methyl-γ-diethylamino propyl carbinol
ε-Dimethyl amino γ-oxapentanol In order to bring the novel therapeutic compounds according to the invention in a form suitable for administering the same, they may be mixed with carrier materials and the invention also comprises said mixtures and the manufacture of the same.

The invention will be elucidated with reference to the following examples:

*Example 1*

5 grams of 3-chloro dibenzo-(a,d)-1,4-cycloheptadienol-5 are dissolved in 20 mls. of benzene, whereupon dry hydrochloric acid gas is introduced. The initial turbidity due to the formation of water disappears when the reaction is completed. The water formed is removed by drying with anhydrous calcium chloride and filtration over a dry filter and the excess of dissolved hydrochloric acid gas is expelled with a stream of dry air. After evaporation of the benzene the corresponding chloride remains.

A mixture of 1 mol of this chloride is heated with 2 mols of dimethylamino ethanol to 140–160° C., the hydrochloride of the amino alcohol and the free amino alkyl ether base being produced.

After cooling the hydrochloride is separated in the bottom and the base being taken up in ether. The base if necessary after intermediate purification by fractionated distillation is treated in an ether solution, with an alcohol ether solution of an acid, e.g. maleic acid. Yield 40%. Melting point of the maleinate 131–132° C.

In the same manner the preceding compounds may be prepared.

*Example 2*

10.5 grams of dibenzo-(a,d) 1,4-cycloheptadienol-(5), 8.4 grams of tropine and 12 grams of toluene sulphonic acid are heated together at 150° C. for 4 hours under reduced pressure. The reaction mixture is cooled, taken up in water and made alkaline with sodium hydroxide. The free base is taken up in ether and dried, whereupon a solution of maleic acid in ether is added. The separated salt is purified by recrystallizations from alcohol ether. Melting point of the resulting maleinate after drying 132–135° C. Yield 10%.

In the same manner the ethers of tropinol with the following carbinols can be prepared:

3-methyl dibenzo-(a,d) 1,4-cyclopheptadienol-(5)
3-chloro dibenzo-(a,d) 1,4-cycloheptadienol-(5)
Dibenzo-(a,e) 1,3,5-cycloheptatrienol-(5)
3-methyl-(a,e) 1,3,5-cycloheptatrienol-(5)

*Example 3*

(a) 52.25 g. (0.25 mol) of dibenzo-(a,d) 1,4-cycloheptadienol-(5) are dissolved in 150 ml. xylene. 24 g. of thionyl chloride are added dropwise to the solution in about 20 minutes, the solution being stirred and cooled so as to maintain a temperature of about 20° C. After the addition of the thionyl chloride stirring is continued for another 1½ hours at room temperature. Anhydrous calcium chloride is then added to bind the water formed and the solution is filtered. After removal of the solvent by distillation a residue consisting of crystalline dibenzo-(a,d) 1,4-cycloheptadienylchloride-(5) is obtained. The product is recrystallized from petroleum ether (boiling point 80–100° C.), while adding norit; a chloride with a melting point of 101–103° C. is obtained in a yield of 92%.

(b) 35 g. (0.25 mol) of tropine are dissolved in 100 ml. xylene. 50 g. (0.5 mol) of sodium carbonate are added and the mixture is heated to boiling. Some foaming may occur in the course of this treatment.

57 g. (0.25 mol) of the chloride mentioned above, dissolved in 150 ml. xylene, are added in the course of about 30 minutes to the boiling mixture. Instead of the purified chloride with a melting point of 101–103° C. we may also use the crude reaction mixture after the calcium chloride has been removed by filtration. After the addition of the chloride the reaction mixture is boiled 2 hours with reflux cooling. The reaction mixture is then cooled to room temperature and the solid sodium chloride and sodium carbonate are removed by filtration. The reaction mixture is subsequently washed with water and dried by means of anhydrous sodium carbonate.

After removal of the solvent by distillation the desired compound dibenzo-(a,d) 1,4-cycloheptadienyl-(5) tropinylether is recovered by distillation under reduced pressure. Boiling point 190–197° C./1 mm. Hg, yield 65% calculated on the cycloheptadienylchloride.

| R₁ | R₂ | X | Y | Z | Boiling point base | Yield, percent | Salt | Melting point salt, °C. |
|---|---|---|---|---|---|---|---|---|
| H | H | —CH₂—CH₂— | —CH₂—CH₂— | N(CH₃)₂ | 140–150°/0.5 mm | 65 | maleinate | 118–120 |
| CH₃ | H | —CH₂—CH₂— | —CH₂—CH₂— | N(CH₃)₂ | | 38 | do | 124–125 |
| H | H | —CH₂—CH₂— | —CH₂—CH₂—O—H₂C—CH₂ | N(CH₃)₂ | 163–173°/0.01 | 69 | oxalate | 123–124 |
| H | H | —CH=CH— | CH₂—CH₂ | N(CH₃)₂ | | 57 | maleinate | 125–128 |

I claim:
1. A compound of the group consisting of bases of the formula

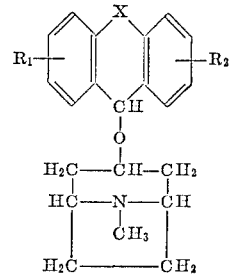

wherein X is selected from the group consisting of —CH₂—CH₂— and —CH=CH—, R₁ and R₂ are each selected from the group consisting of hydrogen, halogen and alkyl up to 4 carbon atoms, and the non-toxic acid addition salts of said bases.

2. The tropine ether of dibenzo-(a,d)-1,4-cycloheptadienol-(5).

3. A non-toxic acid addition salt of the tropine ether of dibenzo-(a,d)-1,4-cycloheptadienol-(5).

References Cited in the file of this patent
UNITED STATES PATENTS

| | | |
|---|---|---|
| 2,688,638 | Gump et al. | Sept. 7, 1954 |
| 2,691,679 | Wright et al. | Oct. 7, 1954 |
| 2,706,198 | Weijlard et al. | Apr. 12, 1955 |
| 2,782,200 | Nield et al. | Feb. 19, 1957 |
| 2,872,452 | Zeile et al. | Feb. 3, 1959 |

FOREIGN PATENTS

| | | |
|---|---|---|
| 765,821 | Great Britain | Jan. 16, 1957 |